Figure 1:
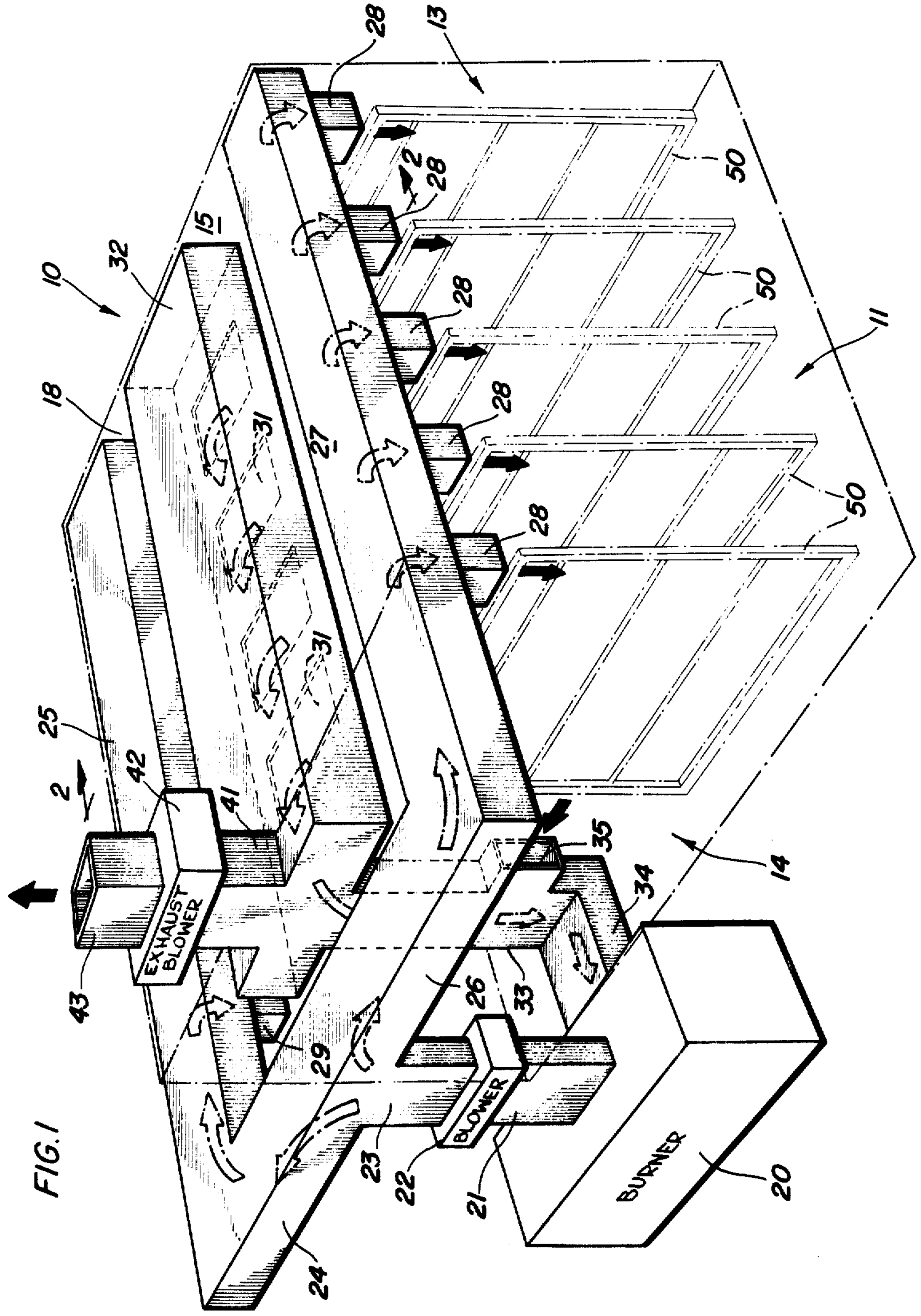

United States Patent [19]

Moore

[11] 3,896,242

[45] July 22, 1975

[54] PROCESS FOR SMOKING COMESTIBLE MATERIAL

[75] Inventor: Donald G. Moore, Manitowoc, Wis.

[73] Assignee: Red Arrow Products Company, Milwaukee, Wis.

[22] Filed: July 9, 1973

[21] Appl. No.: 377,456

[52] U.S. Cl. .................................. 426/314; 426/315

[51] Int. Cl.$^2$ .............................................. A23B 4/04

[58] Field of Search ........... 426/223, 224, 235, 314, 426/315, 302, 310, 312, 212, 221, 342

[56] References Cited

UNITED STATES PATENTS

| | | | |
|---|---|---|---|
| 2,352,590 | 6/1944 | Trinkle | 426/315 X |
| 2,832,278 | 4/1958 | Taranik | 426/235 X |
| 2,844,478 | 7/1958 | Hanley et al. | 426/235 |
| 3,503,760 | 3/1970 | Allen | 426/314 X |

*Primary Examiner*—A. Louis Monacell
*Assistant Examiner*—R. A. Yoncoskie
*Attorney, Agent, or Firm*—Merriam, Marshall, Shapiro & Klose

[57] ABSTRACT

A comestible product is smoked by injecting liquid smoke as a cloud of atomized liquid smoke droplets into a smoking chamber containing the comestible product, withdrawing a gaseous stream of the liquid smoke cloud and air from the smoking chamber, feeding the withdrawn gaseous stream containing the liquid smoke cloud back to the smoking chamber and continuing said process until the comestible product acquires an acceptable smoke flavor and smoke color.

9 Claims, 2 Drawing Figures

PROCESS FOR SMOKING COMESTIBLE MATERIAL

This invention relates to a method of smoking comestible products using liquid smoke which has been converted to a cloud of atomized liquid smoke droplets. More particularly, this invention is directed to a process of smoke flavoring comestible products in which a cloud of atomized liquid smoke droplets is repeatedly fed into a smokehouse or food smoking chamber, removed therefrom and recirculated back into the smokehouse or food smoking chamber.

The smoking of comestible products has been done from time immemorial for the purpose of preserving the product as well as to provide it with a desirable flavor and appearance. All types of meat products including ham, bacon, frankfurters and other sausage, poultry, fish and other food products, such as cheese, are smoked for these reasons.

Comestible products have been smoked or smoke flavored for a long period of time by placing the product in contact with smoke produced by limited combustion of a cellulosic material such as wood. Smoking of comestible products in this way is time consuming and involves a considerable investment in smoke generating equipment which generally does not have a long useful life.

To obtain more uniformity of product and increased control, various liquid smoke materials have been developed for smoke flavoring comestible products. By "liquid smoke" is meant all liquid mediums capable of imparting a smoke flavor to a comestible product, similar to that flavor achieved by direct smoking techniques, when the comestible product is exposed to the liquid medium. One of the most suitable liquid smoke products now available is described in Hollenbeck U.S. Pat. NO. 3,106,473 and marketed as Char-Sol. It is produced by passing water counter-current to smoke produced by burning wood. The smoke dissolves in the water to produce an aqueous solution of natural wood smoke flavors. Other types of liquid smokes are disclosed in U.S. Pat. Nos. 511,288 and 1,656,716.

Liquid smoke materials have been used to smoke flavor comestible products in a number of ways. One way has been to dip the comestible product in the liquid smoke. A second way has been to spray the comestible product with a stream of liquid smoke. A third way to apply liquid smoke is disclosed in Allen U.S. Pat. No. 3,503,760 in which liquid smoke is atomized into a conventional smokehouse having a smoking chamber containing the comestible product to be smoked. In this process, the duct system normally incorporated into the conventional smokehouse for the purpose of feeding natural gaseous smoke to the smoking chamber, recirculating it and finally venting it out, is closed off when the liquid smoke is atmoized into the smokehouse. An auxiliary fan may be placed in the smoking chamber to enhance distribution of the atomized liquid smoke throughout the smoking chamber containing the comestible product to be smoked. Except for the fan, or the propelling air from the liquid smoke atomizing nozzles, the atomized liquid smoke cloud is otherwise kept in a static state in the smoking chamber. The cloud of atomized liquid smoke is not removed from the smoking chamber and recirculated back into the smoking chamber but instead it is simply distributed throughout the smoking chamber by the auxiliary fan or propelling air from the atomizing nozzles and left in a suspended state. This semi-static state however leads to condensation and settling out of the atomized liquid smoke droplets or particles. Furthermore, during injection of the atmozied liquid smoke into the smoking chamber, and while it is distributed therein, heating of the smoking chamber is discontinued. Heating is discontinued because in the absence of air, caused by closing the duct system to keep the liquid smoke cloud in the smoking chamber, the burners cannot continue to burn and without adequate burning uncombusted fuel gas could accumulate and lead to a fire or explosion later when heating is once again initiated. Further, even if the burners continued burning the resulting heat would be prevented from entering the smoking chamber because of the closed ducts.

Although the described process of smoking comestible products by means of the atomization of liquid smoke has some recognized advantages, the process has not realized its full potential because the development of smoke color, and the amount of smoke flavor in the smoked product, have not reached levels considered by many food experts to be satisfactory for a good smoked comestible product.

It has been found according to the subject invention that the smoking of a comestible product can be improved considerably with respect to flavor and color by the method of withdrawing a cloud of atomized liquid smoke droplets from a smoking chamber containing a comestible product to be smoked, such as in a smokehouse, and then recirculating the liquid smoke cloud back to the smoking chamber into contact with the comestible product and continuing said recirculation of the liquid smoke cloud, desirably while maintaining heating of the comestible product, until the comestible product acquires the desired smoke flavor and color. The circulating blower and duct system present in contemporary smokehouses and normally used to circulate air heated by a burner or other means, such as steam coils, to cook the comestible product, can be readily employed in practicing the described process. The blower facilitates removal of the liquid smoke cloud from the smoking chamber by lowering the pressure at the exit ducts and increasing the pressure of the liquid smoke cloud stream returned to the smoking chamber.

By leaving the smokehouse air inlet partially open, and by leaving the exhaust vent or outlet from the smokehouse slightly open, enough fresh air is drawn in during recirculation of the liquid smoke cloud to supply enough oxygen to the burner to combust the fuel fed to it and thereby provide continuous heating of the smoking chamber, and the comestible product therein, during most if not all of the smoking period, which generally employs temperatures from about 60° to 210°F. and may go as high as 230°F. but usually is in the range of 120°–175°F. The smoke house air and smoke cloud can also be heated indirectly by steam passing through various types of heat exchangers. The recirculation of the atomized liquid smoke cloud causes the cloud to move rapidly around the smoking chamber to thereby increase the amount of contact of the smoke cloud with, and its impact on, the comestible product. By increasing the amount and impact of contact of the smoke cloud with the comestible product, plus desirably the application of heat during recirculation of the smoke cloud, the development of increased smoke flavor and smoke color in the comestible product is achieved. These improved results are obtained generally more rapidly and with less liquid smoke than is the smoking effect without recirculation of the liquid smoke cloud into and out of the smoking chamber.

Recirculating the liquid smoke cloud according to the invention results in good coverage of the liquid smoke onto the comestible product. By proper operation of the process a better deposit of liquid smoke on the product is obtained, with increased smoke flavor, often in less time and often with use of a smaller volume of liquid smoke, than by means of prior processes. It is believed that the substantially, and usually essentially, continuous circulation of the liquid smoke cloud to and from the smoking chamber retards or reduces the settling of the liquid smoke cloud droplets onto the floor of the smoking chamber, thereby maintaining more smoke in suspension for ultimate contact with the comestible product. In addition, the recirculation of the liquid smoke cloud reduces coalescence of the small liquid droplets into larger ones which would settle at a greater rate than the small droplets. This also serves to keep a larger amount of the cloud in suspension.

Figure 2:
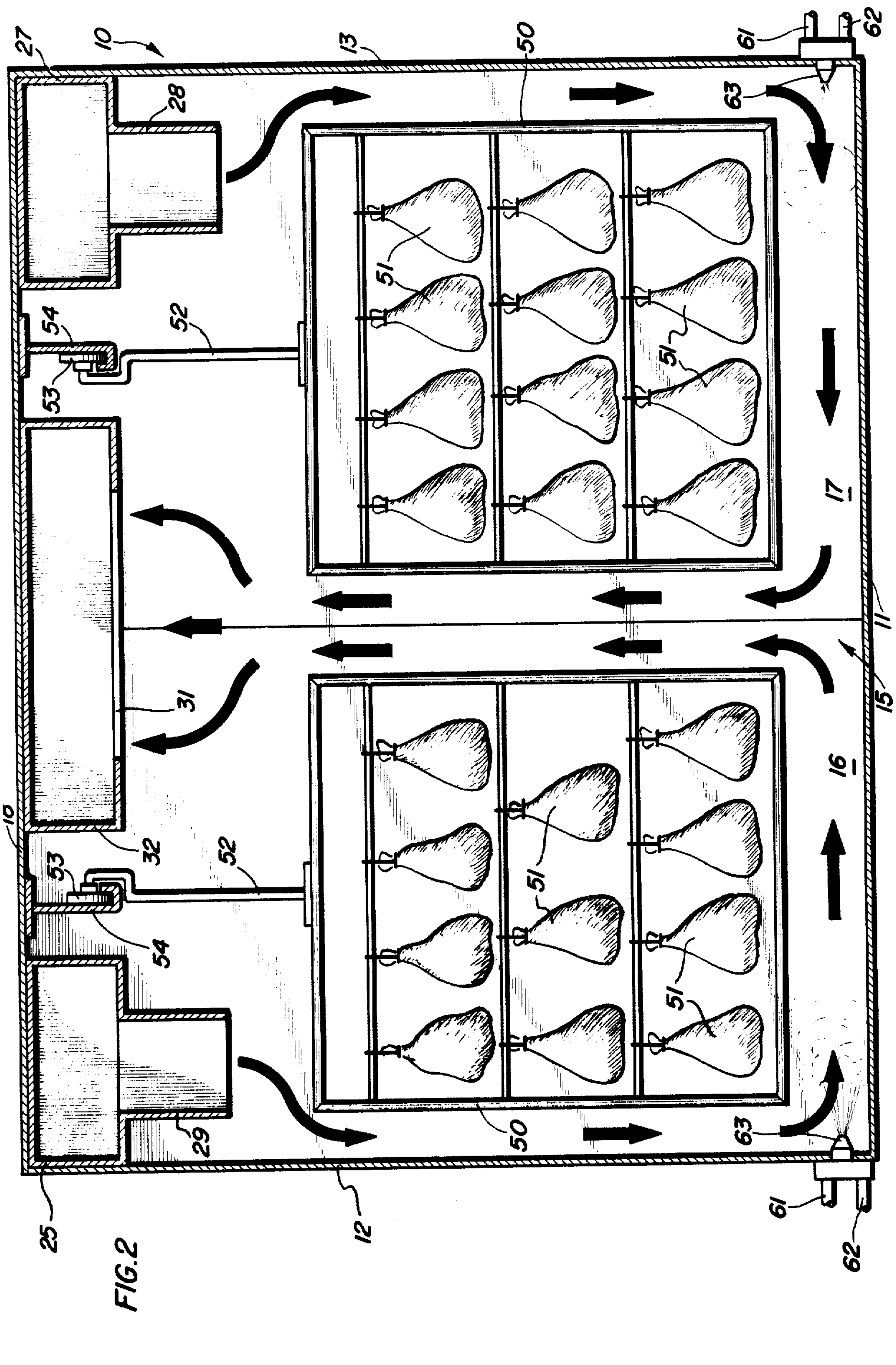

The invention will be described further in conjunction with the attached drawings, in which:

FIG. 1 is an isometric partially schematic view of a contemporary smokehouse without equipment shown for generating smoke from a cellulosic material such as a wood; and FIG. 2 is a vertical sectional view taken along the line 2—2 of FIG. 1.

So far as is practical the same or similar elements which appear in the various views of the drawings will be illustrated by the same numbers.

As shown in the drawings, smokehouse 10 of conventional construction has a smoking chamber defined in part by floor 11, opposing side walls 12 and 13, a back wall 14 and a front wall 15 divided into two doors 16 and 17 which are mounted to swing outwardly to provide access to the smokehouse. The smoking chamber is completed by a ceiling 18.

Burner 20 is located outside of the smokehouse and it is used to provide sufficient heat to cook or otherwise treat the comestible product in the smokehouse during the smoking process. Burner 20 can be provided with fuel by means not shown. The preferred fuel is a combustible gas such as natural gas, although oil can be used. Heated air from burner 20 flows to conduit 21 which is in communication with blower 22. The blower 22 forces the heated air at increased pressure to duct 23 which is in communication with the two duct branches 24 and 26. Duct branch 24 feeds part of the heated air to supply duct 25 while duct branch 26 feeds part of the heated air to supply duct 27. The heated air flows out of duct 27 through downwardly extending ports 28. Supply duct 25 has similar downwardly extending ports 29. The heated air flows downwardly along the interior of smoking chamber side walls 12 and 13 toward the central portion of the smoking chamber and then it flows upwardly to openings 31 in return duct 32.

Duct 32 is positioned in the smoking chamber just below the inside surface of ceiling 18. The heated air is conveyed by return duct 32 to vertical duct 33 which delivers the heated air to duct 34 which feeds it to burner 20. Vertical duct 33 is provided with an air inlet oppening 35 located outside of the smoking chamber. The necessary air needed for combustion of the fuel in burner 20 is supplied by means of opening 35. The opening 35 is provided with a damper or door, not shown, to regulate the amount of air taken in and to close it off completely when this is considered desirable. Circulation of the heated air through return duct 32 into ducts 33 and 34 is achieved by means of the reduced pressure developed therein because of the operation of blower 22.

Return duct 32 is also provided with an upwardly extending duct 41 which communicates with exhaust blower 42 which blows used smoke or heated air out through exhaust duct 43. The upwardly extending outlet duct 41 is provided with a damper door, not shown, to regulate or close off completely flow of heated air or other gaseous materials through it to blower 42.

A plurality of comestible product cages 50, shown with hams 51, are suspended by arms 52 having rollers 53 on the upper ends thereof which roll in rails 54 mounted to the inside of ceiling 18. The cages 50 are positioned inside of the smoking chamber so as to permit flow of smoke around all of the comestible products hung on them in the smoking chamber.

Production of a cloud of atomized liquid smoke is achieved in the smoking chamber by means of a pressurized air line 61 and a liquid smoke feed line 62, both of which are in communication with atomizing nozzle 63. The pressurized air forces the liquid smoke through atomizing nozzle 63 in the form of very fine liquid droplets which can be controlled to be of any suitable size, such as with most below 150 microns. A smoke cloud having droplets below 150 microns maintains its cloud-like characteristics for a considerable period of time and even when maintained in a still state inside of the smoking chamber such small sized droplets continue suspended for a significant time period because of their small size. Nevertheless, the liquid smoke cloud circulation process of this invention serves to further retard unwanted settling of the droplets and keeps them in suspension to a much greater extent than is achieved according to the prior process in which the liquid smoke cloud is kept in the smoking chamber and not removed from the smoking chamber by circulating it through the smokehouse duct system and then returning it to the smoking chamber.

After the cloud of liquid smoke has been atomized into the smoking chamber it is caused to flow toward the lower central part of the smoking chamber and then upwardly into the return duct 32 from which it flows through ducts 33 and 34 into burner 20. The burner is kept on and is desirably in continuous operation during the smoking process. The liquid smoke cloud is thus heated in the burner and fed therefrom into duct 21, then to blower 22 and from it to duct 23 which distributes it to the branch ducts 24 and 26 which deliver it to ducts 25 and 27 from which the liquid smoke cloud is delivered by ports 28 and 29 into the smoking chamber. The air inlet 35 is maintained slightly open and the damper or door in vent duct 41 is also kept slightly open so as to let in an adequate supply of fresh air to provide oxygen for the burner and for some of the heat and liquid smoke cloud to be vented from the smoking chamber during the process.

The atomized liquid smoke cloud can be generated continuously or intermittently during the smoking and cooking process. There is generally, however, no need for a liquid smoke cloud to be generated continuously during the smoking operation. However, normal heating can take place at all times, even during generation of the liquid smoke cloud and its circulation.

The described circulation of the liquid smoke cloud leads to significantly improved and more uniform deposition of the liquid smoke on the comestible product. This apparently results through improved contact of the droplets of the liquid smoke cloud with the comestible product and through a higher impact force with which the liquid smoke cloud droplets impinge on the surface of the comestible product plus a more uniform distribution of the cloud as it circulates through the smoking chamber.

Although it was considered previous to this invention to be necessary that the smoke cloud generated by atomization of liquid smoke have mostly or substantially all droplets below 150 microns in size in order for the cloud to remain suspended for an adequate time in the smoking chamber because of the relatively still conditions which it was intended be present there, the process of the subject invention can be practiced entirely satisfactorily by use of a smoke cloud generated by nebulization of liquid smoke to give droplets or particles in which a major amount, or most, of the droplets have an average size substantially greater than 150 microns. Apparently recirculation of the liquid smoke cloud through the duct system, especially while heating, and back to the smoking chamber prevents the larger size droplets of the liquid smoke cloud from appreciably settling or depositing during the smoking process. The larger particles or droplets furthermore develop a greater force because of the recirculation and they thus impact harder on the comestible product being smoked than the smaller droplets below 150 microns and this gives improved deposition on the comestible product.

In practicing the process of this invention it is advisable to regulate the blower system of the smokehouse so that the smoking chamber gaseous content volume is changed by recirculation at least 2 times per minute to obtain the desired atomized liquid smoke deposition on the comestible product. The efficiency of the smoking process will generally increase with an increase in changes per minute and for this reason five or more changes of the gaseous content (liquid smoke cloud plus heated air) per minute are desirably employed. A lesser time can thereby often be used for the smoking process, or a greater smoke flavor effected in a normal smoking period. It generally is unnecessary to change the gaseous content of the smoking chamber more than 20 times per minute to achieve the benefits of the invention and with most smokehouses a maximum of 15 changes per minute is adequate. Regardless of the changes of gaseous content per minute in the smoking chamber, the burner is kept on most or all of the time to supply substantially continuous heat to the comestible product during the liquid smoke treatment. This prevents the comestible product and the smoking chamber from cooling to a significant extent, and decreases the amount of smoke flavoring that condenses on the cooler smokehouse walls and equipment and thus is lost to the flavoring process.

The following examples are presented to further illustrate the invention.

EXAMPLE 1

Six trees of bacon bellies were placed in the smoking chamber of a conventional smokehouse of the type shown in the attached drawings (six-cage Alkar smokehouse) for heat processing and smoking. The bellies were subjected to a cook-smoke cycle with 15 changes per minute of the gaseous content of the smoking chamber used throughout the cycle as follows:

1. 120°F. for 60 minutes — The exhaust and fresh air dampers were open in their normal operating positions, and the smokehouse circulating blower was on.
2. The exhaust and fresh air dampers were closed with the smokehouse burner and circulating blower left on. A cloud of nebulized (atomized) liquid smoke (Char-Sol C-10 made from hard maple sawdust and having a 10–12% total acidity as acetic acid and a phenolic level of 14–17 mg./ml.) was produced in the smoking chamber by atomizing nozzles, and it was circulated using the blower. The droplets of the liquid smoke cloud were mostly all less than 50 microns and were generally in the range of 10–40 microns. The atomization and circulation of the liquid smoke cloud with the heating burner on was continued for 50 minutes at 120°F., after which the atomization was terminated but the remaining cloud of liquid smoke droplets was circulated for an additional 10 minutes at 120°F. At no time was the heating burner or circulating blower turned off during this 60 minutes of exposure of the bacon bellies to the liquid smoke cloud at 120°F. A total of 187 oz. of liquid smoke (8.4 oz. per 100 lbs. of meat) was used.
3. 130°F. for 60 minutes with exhaust and fresh air dampers open and circulating blower on.
4. 140°F. for 60 minutes using conditions otherwise the same as in 3.

As this point the product had reached an internal temperature of 128°F. and the cooking and smoking cycle was completed.

The cages of product were then moved to a chill cooker for conditioning the bacon bellies for pressing. The bellies were evaluated and were found to have an excellent uniform smoked color from top to bottom, and excellent aroma and flavor.

EXAMPLE 2

Approximately 15 tress of bacon bellies were placed in the smoking chamber of a conventional smokehouse of the type illustrated by the attached drawings (32 cage Atmos smokehouse) for heat processing and smoking. The bacon bellies were simultaneously exposed to a cook-smoke cycle, with 15 changes per minute of the gaseous content of the smoking chamber used throughout the cycle, as follows:

1. 140°F. for 60 minutes — The exhaust and fresh air dampers were open in the normal operating positions, and the smokehouse circulating blower was on.
2. The exhaust and fresh air dampers were closed to minimize loss of atomized liquid smoke and the smokehouse circulating blower and heating burner were kept on.
3. An aqueous solution of natural wood smoke flavors (Char-Sol C-10 liquid smoke) was atomized into the smoking chamber over the next 1½ hours simultaneous with heating at 145°F. (burner and blower on) as follows:

A. The liquid smoke atomization was continued for 15 minutes with the burner and blower on.

B. The generation or atomization of the liquid smoke cloud was terminated for 15 minutes, while the initial cloud of liquid smoke was circulated with the burner and smokehouse blower on.

C. The atomization or generation of the liquid smoke cloud was started again for 15 minutes as in (A).

This sequence of 15 minutes of liquid smoke cloud generation and 15 minutes of circulation of the smoke cloud was repeated for the 1½ hours. The droplets of the cloud were less than 50 microns in size and were mostly in the range of 10–40 microns. (This same sequence of on/off periods was later tried with 12 minute intervals with equally good results.)

4. The product was heated for 3½ hours at 145°F. after the exhaust and fresh air dampers were opened to their normal operating position and the circulating blower was put on.

At the end of this time the product reached an internal temperature of 128°–130°F. and the cooking and smoking cycle was completed. The trees of product were moved to a chill cooler for conditioning the bacon bellies for pressing. The bacon bellies were evaluated and were found to have an excellent uniform smoked color from top to bottom, and excellent aroma and flavor.

EXAMPLE 3

The procedure of Example 1 was repeated except that in step 2 the liquid smoke was atomized into the smoking chamber for 30 minutes with the circulating blower and heating burner on, after which circulation of the smoke cloud was continued for 10 minutes with the heat on without addition of more liquid smoke. A total of 47 oz. of liquid smoke (Char-Sol C-10) was used at a rate of 3.1 oz. per 100 lbs. of meat. The resulting bacon bellies had good smoke flavor and uniformity of color from top to bottom.

EXAMPLE 4

The procedure of Example 1 was repeated except that in step 2 the liquid smoke was atomized into the smoking chamber for 45 minutes with the circulating blower and heat on, after which circulation of the smoke cloud was continued for 10 minutes with the heating burner on without addition of more smoke. A total of 88 oz. of liquid smoke (Char-Sol C-10) was used at a rate of 4.9 oz. per 100 lbs. of meat. The resulting bacon bellies had good smoke flavor and uniformity of color from top to bottom.

EXAMPLE 5

Six trees of bacon bellies were placed in a conventional smokehouse of a type similar to the one illustrated in the drawings (6 cage Alkar smokehouse) for heat processing and smoking. The cycle used was as follows:

1. 130°F. for 60 minutes — The exhaust damper and fresh air inlet damper were open in their normal operating positions, and the circulating blower and heating burner were on.
2. The exhaust and fresh air dampers were closed and the circulating blower was turned off, as was the heating burner. A cloud of atomized liquid smoke (Char-Sol C-10) was introduced into the smoking chamber by means of atomizing nozzles for 35 minutes, amounting to 140 oz. of liquid smoke or 6.3 oz. per 100 lb. of meat. The droplets in the smoke cloud were mostly less than 50 microns, and generally were in the range of 10–40 microns. The atomization was terminated by closing off the source of liquid smoke, but the atomization air was continued and the product was allowed to be exposed to the air agitated cloud for another 10 minutes with the blower and burner off and the dampers closed.
3. The exhaust and fresh air dampers were opened to their normal operating positions, the remaining smoke cloud was exhausted through the exhaust duct, and the burner and blower were then turned on.
4. The product was heated at 130°F. for 90 minutes.
5. The product was heated at 140°F. for approximately 120 minutes.

At this point the product had reached an internal temperature of 128°F. and the cooking and smoking cycle was completed.

The cages of product were then moved to a chill cooler for conditioning the bellies for pressing. The bellies were evaluated and were found to be very light, almost devoid of any significant smoke color, and nonuniform in surface smoke color development. All members of a quality evaluation panel considered the bacon to be unsatisfactory in smoke color, flavor and aroma.

EXAMPLE 6

Several sticks of wieners (skinless) were placed in the smoking chamber of a smokehouse of a type similar to the one illustrated in the drawings (2 cage Alkar smokehouse) for heat processing and smoking. The cycle used was as follows:

1. 140°F. for 30 minutes. The exhaust damper and fresh air inlet damper were open in their normal operating positions, and the circulating blower and heating burner were on.
2. The exhaust and fresh air dampers were closed and the circulating blower was turned off as was the burner. A cloud of atomized liquid smoke (Char-Sol C-10) was introduced into the smoking chamber by means of atomizing nozzles for 7 minutes, amounting to 15.8 oz. of liquid smoke or 15.8 oz. per 100 lb. of meat. The droplets in the liquid smoke cloud were mostly less than 50 microns, and usually in the range of 10–40 microns. The atomization was terminated, the air was turned off and the product was exposed to the static liquid smoke cloud for another 15 minutes with the blower and burner off and the dampers closed.
3. The exhaust and fresh air dampers were opened to their normal operating position, the smoke cloud was exhausted, and the burner and blower were turned on.
4. The product was heated at 210°F. for 22 minutes. At this point the wieners had reached an internal temperature of 160°F. The wieners were then rinsed with cool water to chill them, and then placed in a chill cooler overnight. The wieners were evaluated and were found to be very light, with no noticeable smoke color, and no smoked aroma and/or flavor. They were considered unsatisfactory by all members of a quality evaluation panel.

EXAMPLE 7

Test 1

An Atmos standard 2 cage smokehouse equipped with an atomizing nozzle utilizing a gravity feed liquid line and an air line (25 to 70 psia) and designed to produce a smoke cloud having a major proportion of the droplets below 50 microns and most in the range of 10–40 microns, was used.

A. The exhaust damper, and special dampers installed in the ducts to seal the atomized liquid smoke cloud in the smoking chamber were closed to minimize loss of the liquid smoke cloud.

B. Preweighed trays were placed on the floor of the smoking chamber and they were positioned approximately where meat cages would normally be located.

C. The smokehouse doors were closed and the atomization of liquid smoke was started and maintained for 38 minutes.

D. The atomization was terminated, and the dampers were opened to exhaust the remaining suspended liquid smoke cloud.

E. The pans or trays were again weighed to determine the amount of liquid smoke fall-out during atomization under static conditions (house blower off). Approximately 1173 grams of liquid smoke (Char-Sol H-10 same as C-10 but made from hickory sawdust rather than hard maple sawdust) was atomized, of which from 0.72 percent to 1.6 percent was recovered as fall out in the trays during the 38 minutes.

Test 2

The same smokehouse and liquid smoke atomizing equipment used in Test 1 was used in Test 2.

A. The exhaust damper was closed as in Test 2. However, the special dampers referred to in Test 1 were left open to allow for the entering and exiting of the atomized liquid smoke cloud to and from the smoking chamber by means of the ducts as normally would occur during heat processing. The circulating blower was turned on.

B. Weighed trays were positioned on the floor of the smoking chamber as in Test 1.

C. The smokehouse doors were closed, and the atomization of liquid smoke was started and maintained for 38 minutes.

D. The atomized liquid smoke cloud was circulated throughout the smoking chamber and duct work using the circulating blower during the 38 minutes of liquid smoke generation (3 air changes/min.).

E. The atomization was terminated and the exhaust dampers were opened to exhaust the remaining suspended liquid smoke cloud.

F. The pans or trays were weighed to determine the amount of fall-out during atomization with circulation of the liquid smoke cloud by means of the blower. Approximately 1902 grams of liquid smoke (Char-Sol H-10) was atomized, of which from 0.04 to 0.078 was recovered as fall out in the trays during the 38 minutes.

Even though a much greater quantity of liquid smoke was atomized in Test 2, the very low amount recovered in the trays shows that circulating the atomized liquid smoke cloud significantly minimizes fall-out of the cloud droplets.

EXAMPLE 8

Test 1

An Atmos standard 2 cage smokehouse equipped with an atomizing nozzle was used. The nozzle was fed liquid smoke (Char-Sol H-10) via a pressure tank operating at 25 psi. Under these conditions the nozzle produced a liquid smoke cloud having droplets in the range of 60 to 330 microns with 60 percent of the droplets being larger than 150 microns. The nozzle was placed in the back of the house about 8 inches from the floor. The nozzle was angled upward slightly to prevent the spray from hitting the floor.

A. The exhaust damper, and special dampers installed in the duct to seal the atomized cloud in the smokehouse, were closed to minimize loss of the smoke cloud.

B. Two standard cellulose wiener casings containing 40 mls of a 5 percent glycine aqueous solution were hung on opposite sides of a sausage tree in the smokehouse approximately 3 ft. above the floor. The tree was placed approximately in the center of the smokehouse with one casing toward the back of the smokehouse and one casing toward the front of the smokehouse.

C. The smokehouse doors were closed and the liquid smoke atomization was started and maintained for 20 minutes under static conditions at room temperature (smokehouse closed with blowers off and no heat). About 5482 mls. of liquid smoke was atomized.

D. The atomization was terminated, the dampers were opened and the exhaust blowers were turned on to exhaust the remaining suspended liquid smoke cloud.

E. The casings were emptied. The volume of the glycine solution was brought back to 40 mls. with distilled water and warmed for 30 min. at 50°C. to develop smoke color.

F. The glycine solution was cooled to room temperature and was read for optical density at 490 mu on a Bausch & Lomb Spectrophotometer 20.

Test 2

The same smokehouse and equipment were used in this test as in Test 1 of this Example 8.

A. The exhaust and fresh air dampers were closed and the exhaust blower was off as in Test 1. The special damper was left open to allow the atomized smoke cloud to enter and exit the smoking chamber and to circulate through the smokehouse ducts. The smokehouse supply blowers were turned on but with no heat. The test thus was at room temperature.

B. Cellulose casings were used as in Test 1 containing the same volume of 5 percent glycine solution. Casing placement and tree placement was the same as in Test 1.

C. The liquid smoke atomization time was the same as in Test 1 and about 6000 mls. of liquid smoke was atomized. The smokehouse conditions were as described in A. above (about 3 air changes/min.).

D. Atomization was terminated, the exhaust dampers were opened and the exhaust blowers was turned on to exhaust the smoke cloud from the smokehouse.

E. The casings were removed and the glycine solution was further treated as in E. and F. of Test 1.

Results

Test 1. Static droplets (60 percent larger than 150 microns). The optical densities, measured at 490 mu, of the glycine solutions were as follows.

| No. 1 casing at back of smokehouse | No. 2 casing at front of smokehouse |
|---|---|
| 0.060 | 0.074 |
| Av. - 0.067 | |

Test 2. Moving droplets (60 percent larger than 150 microns).

| No. 1 casing at back of smokehouse | No. 2 casing at front of smokehouse |
|---|---|
| 0.170 | 0.072 |
| Av. - 0.121 | |

The optical density value is a measurement of the intensity of a chemical reaction which occurs principally between the carbonyls in the smoke cloud and the amino acid solution, glycine, which results in color development within the glycine solution. Accordingly, the higher the optical density value the greater the intensity of the reaction, and thus the greater the amount of smoke carbonyls which penetrates the casing and/or product.

EXAMPLE 9

The two tests of Example 8 were essentially duplicated using the same smokehouse and liquid smoke but with different atomization equipment. The nozzle used in these tests was designed to produce a liquid smoke cloud having particles less than 50 microns, and mostly in the range of 10–40 microns. The liquid smoke was fed by gravity to the nozzle and atomized therefrom by air. The atomization period was 25 minutes.

Results

Test 1. Static liquid smoke droplets. The optical densities measured at 490 mu of the glycine solutions were as follows:

| | No. 1 casing at back of smokehouse | No. 2 casing at front of smokehouse |
|---|---|---|
| Run 1 | 0.067 | 0.060 |
| Run 2 | 0.068 | 0.070 |
| | Av. - 0.066 | |

Approximately 781 mls. of Char-Sol C-10 was used in Run 1 and approximately 770 mls. was used in Run 2.

Test 2. Moving liquid smoke droplets. The optical densities of the glycine solutions were as follows:

| | No. 1 casing at back of smokehouse | No. 2 casing at front of smokehouse |
|---|---|---|
| Run 1 | 0.189 | 0.217 |
| Run 2 | 0.160 | 0.140 |
| | Av. - 0.176 | |

Approximately 779 mls. of Char-Sol C-10 was used in Run 1 and 786 mls. of it was used in Run 2.

The greater optical density of the glycine solutions in Test 2 show that the driving force of the smokehouse blowers does give greater smoke penetration. This penetration averaged almost 3 times more in the moving liquid smoke droplet process of Test 2 than in the static droplet process of Test 1.

EXAMPLE 10

Test 1

An Atmos standard 2 cage smokehouse equipped with an atomizing nozzle was used. The nozzle was fed liquid smoke (Char-Sol H-10) via a pressure tank operating at 25 psi. Under these conditions the nozzle produced a liquid smoke cloud having droplets in the range of 60 to 330 microns with 60 percent of the droplets being larger than 150 microns. The nozzle was placed in the back of the smokehouse about 8 inches from the floor. The nozzle was angled upward slightly to prevent the spray from hitting the floor.

A. The exhaust damper, and special dampers installed in the ducts to seal the atomized liquid smoke cloud in the smokehouse, were closed to minimize loss of the smoke cloud.

B. Pre-weighed trays were placed on the floor of the smokehouse positioned approximately where meat cages would normally be located.

C. The smokehouse doors were closed, the liquid smoke atomization was started, and maintained for 20 minutes.

D. The atomization was terminated, and the dampers were opened to exhaust the remaining suspended liquid smoke cloud.

E. The trays were again weighed to determine the amount of liquid smoke droplet fall out during atomization under static conditions with this size droplet.

Test 2

The equipment and smokehouse of Test 1 was used in this test.

A. The exhaust damper was closed and exhaust blower was shut off, as in Test 1. The special dampers referred to in Test 1 were left open to allow for the cloud of liquid smoke to circulate from the smoking chamber, through the ducts and back to the smoking chamber.

B. Pre-weighed trays were positioned on the floor of the smokehouse as in Test 1.

C. The smokehouse doors were closed, and the atomization was started and maintained for 20 minutes. The atomized liquid smoke cloud was circulated throughout the smokehouse and duct work using the smokehouse circulating blower during this 20 min. period.

D. The atomization was terminated, and the exhaust dampers were opened to clear the smoke cloud from the smokehouse.

E. The trays were again weighed to determine the amount of liquid smoke droplet fall-out during atomization with circulation of the smoke cloud.

Results

Test 1. Static smoke cloud process. Approximately 5332 mls. of liquid smoke (Char-Sol C-10) was atomized of which 9.7 percent was recovered in the tray nearest the nozzle and 0.0075 percent, or a negligible amount, was recovered in the tray closest to the door.

Test 2. Moving smoke cloud process. Approximately 6000 mls. of liquid smoke (Char-Sol C-10) was atomized of which 2.3 percent was recovered in the tray nearest the nozzle and 0.0283 percent, or a negligible amount, was recovered in the tray closest to the door.

The movement of the liquid smoke droplets by circulation significantly reduced the droplet fall out. This decrease was more than four times greater with the smokehouse circulating blowers on than with them off. Better smokehouse distribution was also noted with the moving droplets as evidenced by the greater volume of liquid smoke in the second pan by the door.

The foregoing detailed description has been given for clearness of understanding only, and no unnecessary limitations should be understood therefrom, as modifications will be obvious to those skilled in the art.

What is claimed is:

1. A method of smoking a comestible product comprising:

injecting liquid smoke as a cloud of atomized liquid smoke droplets into a smoking chamber, maintained in the temperature range of 60° to 230°F., containing a comestible product;

withdrawing a gaseous stream of the liquid smoke cloud and air from the smoking chamber;

feeding the withdrawn gaseous stream containing the liquid smoke cloud back to the smoking chamber; and continuing said process until the comestible product acquires an acceptable smoke flavor and smoke color.

2. A method according to claim 1 in which the gaseous stream containing the liquid smoke cloud is withdrawn from the upper part of the smoking chamber, and the withdrawn gaseous stream containing the liquid smoke cloud is returned to the upper peripheral space of the smoking chamber and is directed downwardly therefrom about the periphery of the smoking chamber.

3. A method according to claim 1 in which the gaseous stream containing the liquid smoke cloud is withdrawn from, and returned to, the smoking chamber for at least substantially most of the time in which liquid smoke is injected as a cloud of atomized liquid smoke droplets into the smoking chamber.

4. A method according to claim 1 in which the gaseous content of the smoking chamber is changed about 2 to 20 times per minute during the smoking method.

5. A method according to claim 1 in which the comestible product is maintained at an air temperature of about 60° to 210°F. during the smoking method.

6. A method of smoking a comestible product comprising:

injecting liquid smoke as a cloud of atomized liquid smoke droplets into a smoking chamber, maintained in the temperature range of 60° to 230°F., containing a comestible product;

withdrawing a gaseous stream of the liquid smoke cloud and air from the smoking chamber at a rate such that the gaseous content of the smoking chamber is changed about 2 to 20 times per minute during the smoking method;

feeding the withdrawn stream of liquid smoke cloud to a blower to pressurize it;

feeding the pressurized stream of liquid smoke cloud back to the smoking chamber; and continuing said process until the comestible product acquires an acceptable smoke flavor and smoke color.

7. A method of smoking a comestible product in a smokehouse having a smoking chamber, a burner for developing heat in the form of hot air, a supply duct for delivering the hot air from the burner to the smoking chamber, a blower for circulating the hot air from the burner through the supply duct to the smoking chamber, a return duct for withdrawing air from the smoking chamber and delivering it the burner, and an exhaust duct exiting from the smoking chamber, comprising;

placing a comestible product in the smoking chamber;

heating the comestible product by means of the burner and hot air produced thereby and fed with the aid of the blower to the smoking chamber to a temperature of 60° to 210°F.;

producing a liquid smoke cloud in the smoking chamber while the burner is on and the exhaust duct is closed;

withdrawing a gaseous stream of the liquid smoke cloud and heated air from the smoking chamber by means of the return duct, with the exhaust duct closed, delivering it to the burner and returning it by means of the supply duct to the smoking chamber with the blower operating substantially most of the time to facilitate said circulation of the gaseous stream, said burner being on and supply heat to the smoking chamber during at least most of such circulation of the liquid smoke cloud; and continuing said process until the comestible product acquires an acceptable smoke flavor and smoke color.

8. The method of claim 7 in which the exhaust duct is opened after the comestible product has been acceptably smoked and heating of the comestible product is continued to complete cooking of the product.

9. The method of claim 7 in which the gaseous content of the smoking chamber is changed about 2 to 20 times per minute during the smoking method.

* * * * *